United States Patent Office 2,841,571
Patented July 1, 1958

2,841,571
RESINOUS COMPOSITION

Henry P. Wohnsiedler, Darien, Conn., assignor to American Cyanamid Company, New York, N. Y., a corporation of Maine No Drawing. Application November 2, 1954
Serial No. 466,440

12 Claims. (Cl. 260—67.6)

This invention relates to improved thermosetting resinous compositions adaptable to use in the moulding, laminating, adhesive, protective coating, textile finishing and related fields. More particularly, this invention relates to thermosetting resinous compositions derived from the condensation of melamine and formaldehyde. Further, this invention relates to the resinous compositions, their method of production and articles produces therefrom.

It is a well known fact that melamine which has the symmetrical structure identified by the name 2,4,6-triamino-1,3,5-triazine has a unique degree of thermal stability. It has a melting point of 355° C. and at this temperature sublimes undecomposed. In the commercial resins now available and derived from melamine, it has not been possible to realize this potential heat resistance in applications where the utmost in heat resistance is desirable, such as in the molding and laminating industry. This arises from the fact that compositions available to date, unless modified by excessive amounts of other resins, are characterized by poor dimensional stability at elevated temperatures. This instability is itself a disadvantage since it detracts from the constancy of dimension of molded parts. Moreover, through causing stresses, it may lead to cracking of such parts under service conditions.

It has now been found that a high degree of thermal and dimensional stability of fully cured resins may be realized by combining a number of features, including those of composition and process. It is therefore an object of my invention to prepare thermosetting resinous compositions possessing improved dimensional stability. It is a further object of my invention to prepare improved thermosetting resinous compositions by the condensation of melamine with formaldehyde. These and other objects of my invention will be discussed more fully hereinbelow.

The thermosetting resinous compositions of the present invention are derived by condensation of from about 0.9 to about 1.5 mols of formaldehyde per mol of melamine, preferably from about 1.1 to 1.3 mols of formaldehyde per mol of melamine. Resins having such low ratios have been mentioned in the patent literature previously. However, the process of preparation of such resins lacks practical features. Resins having the preferred molar ratios of reactants according to this invention are made by combining the reactants in multistages. In this process the final formaldehyde-melamine ratio is reached stepwise. In order to realize the fullest advantage of such compositions, it is necessary to convert them to their final cured or polymerized state at elevated temperatures. Melamine-formaldehyde resins are commonly cured at 150° C. to 155° C. In the present case compositions are cured at temperatures in the order of at least 170° C., preferably 170° C. to about 225° C.

It has been known prior to the present invention that melamine-formaldehyde resins could be cured at high temperatures. It has not been known heretofore that any advantage could be derived from such high temperature cure and no description has appeared as to which composition might be most effectively combined with high temperature cure nor how advantages of high temperature cure were to be gained.

Melamine has a low degree of solubility in water and dissolves to the extent of about 5% at the boiling point. In reaction with aqueous formaldehyde, at molar ratios lower than 2.0 mols of formaldehyde to 1.0 mol of melamine, in which the solubility of melamine is also low, there is a tendency for the first melamine in solution to react with the excess of formaldehyde proceeding from monomethylol melamine to the monomeric polymethylol melamine leaving undissolved melamine. At a molar proportion of 1.0 mol of formaldehyde to 1.0 mol of melamine, this is accentuated so that it becomes necessary to operate at a water dilution equivalent to about 10% solids in order to obtain a satisfactory resin solution in a single-stage reaction. Excessive amounts of water must then be removed to bring the solids concentration to a satisfactory level for use or to take the resin to a dry state, as by concentration in a kettle or by spray drying. This is largely overcome by carrying out the initial reaction between the melamine and formaldehyde in several steps, as will be discussed more fully in the examples set forth below.

The examples set forth are given by way of illustration and not limitation unless otherwise noted in the appended claims. All parts are parts by weight.

EXAMPLE 1

The preparation of a resinous composition by a two-stage reaction was accomplished by introducing into a suitable reaction vessel 1260 parts of melamine, 406 parts of a 37% aqueous solution of formaldehyde and 990 parts of water. A sufficient amount of an aqueous caustic solution was added to adjust the pH within the order of from about 8.5 to 9.0. The slurry containing 53% by weight of reactants was stirred and heated to reflux temperature in 30 minutes and maintained at that temperature for 45 minutes.

644 additional parts of a 37% aqueous solution of formaldehyde were then added and the temperature of the reaction mixture again raised to reflux. Solution of the melamine was practically complete after about 5 to 10 minutes of stage two. Refluxing was continued until the resin syrup was slightly hydrophobic. The resin syrup was cooled immediately to 70° C. and the pH adjusted to within the range of from 9.9 to 10.1. This composition is characterized by having a formaldehyde-melamine molar ratio (F/M) of 1.3 with a final dissolved solids concentration of 50%.

The resin solution prepared was concentrated at 70° C. under reduced pressure to 80% solids content. A pH buffer was added and the concentrated syrup was then dried in trays to a thin resin layer.

Molding resins obtained by this procedure were molded at different temperatures and tested for dimensional stability in comparison with another group of molded resins derived from a formaldehyde-melamine ratio of 2.0 and prepared by a one-stage syrup operation with other features very much alike in the two series. The resins in the two groups were marked by approximately the same plasticity when molded. They were cured at each of the temperatures under test for their optimum time, judging from the measured water absorption in 30 minute boiling water test in relation to cure time. Test results were as follows:

Table 1

|  | Optimum Cure Time (Mins.) | | Water Absorption Percent (at optimum cure time) | | Mold Shrinkage, mils/inch | | Aging Shrinkage, mils/inch | |
| --- | --- | --- | --- | --- | --- | --- | --- | --- |
|  | 155° | 185° | 155° | 185° | 155° | 185° | 155° | 185° |
| F/M=2.0 | 5–7 | 1–3 | 0.18–0.35 | 0.12–0.20 | 9.3 | 11.6 | 5.0 | 5.0 |
| F/M=1.3 | 5–10 | 1–2 | 0.02–0.17 | 0.04–0.23 | 8.6 | 8.4 | 5.1 | 3.2 |

NOTE.—Each shrinkage value represents the mean for 4–5 test batches and 9–10 test pieces (4″ x ⅛″ discs). All test pieces are molded at 2500 p. s. i. pressure at both 155° C. and 185° C. Mold shrinkage represents difference in dimension of cold mold and cold piece. Aging shrinkage represents change in dimension of test molding exposed 48 hours at 220° F.

These results demonstrate that the improvement in dimensional stability of the 1.3 formaldehyde-melamine ratio resin over the higher ratio resin becomes substantial at the higher of the two molding temperatures whereas at the more conventional molding temperature of 155° C. no significant change occurs, particularly in aging shrinkage. It is thus obvious from the these results that melamine resins in general may be freely cured at high temperatures. On the other hand, unless the composition is a low formaldehyde-melamine ratio type prepared in accordance with the present invention, thermal stability of the molded product is not attained in view of the change in dimension which will result in the course of high temperature exposure.

EXAMPLE 2

A three-stage resin preparation was carried out by introducing into a suitable reaction vessel 946 parts of melamine, 243 parts of a 37% aqueous solution of formaldehyde and 1802 parts of water. The pH of the slurry containing 35% solids was adjusted to 9.1 and the slurry was heated to reflux temperature in a period of about 35 minutes. 243 additional parts of a 37% aqueous solution of formaldehyde were then introduced into the system and the temperature again raised to reflux. The reaction mixture was maintained at reflux temperature for about 30 minutes and 182 additional parts of a 37% aqueous solution of formaldehyde then introduced therein. The temperature of the mixture was again raised to reflux and maintained until the resin was partially hydrophobic according to test. The resinous syrup was cooled immediately and the pH adjusted to raise its value to about 9.9. This composition with a final dissolved solids concentration of 35% had a formaldehyde-melamine molar ratio of 1.1:1.

EXAMPLE 3

The resinous syrup prepared in accordance with Example 1 was buffered with an amine phthalic acid buffer and combined in a suitable mixer with alpha-cellulose in a weight ratio of 3174 parts to 857 parts, respectively. After a homogeneous mixture of the resin impregnated filler was obtained, the mixer product was dried and then comminuted to obtain a resinous molding composition.

EXAMPLE 4

A resinous molding composition was prepared in accordance with Example 3 by combining 3394 parts of the resinous syrup prepared by Example 1 with 637 parts of alpha-cellulose.

EXAMPLE 5

Modified resinous compositions were prepared by combining with the resinous syrups prepared by Examples 1 and 2 different plasticizers in varying amounts. The resinous syrups containing the plasticizers were then combined with a filler and a molding composition prepared as set forth in Examples 3 and 4. Set forth below are illustrative examples of resinous compositions prepared.

Table 2.—Values for aging shrinkage

[Mils/inch.]

| F/M | Plasticizer | Percent | Number of Batches | 155° Cure, Different Molding Cycles | | | 170° Cure, Different Molding Cycles | | |
| --- | --- | --- | --- | --- | --- | --- | --- | --- | --- |
|  |  |  |  | 0–10–10[1] | 10–10–10 | 30–10–20 | 0–10–10 | 10–10–10 | 30–10–20 |
| 1.3 |  |  | 5 |  | 4.2–5.6 |  |  | 2.8–4.2 |  |
| 1.1 |  |  | 1 |  | 4.8–5.1 |  |  | 3.8–4.0 |  |
| 1.3 | Diglyceryl Phthalate | 15 | 2 | 3.2–3.4 |  |  | 2.8–3.0 |  |  |
| 1.3 | do | 25 | 1 |  | 1.9–2.0 |  |  | 0.1–0.3 |  |
| 1.1 | do | 15 | 1 |  | 1.9–2.1 |  |  | 0.7–1.0 |  |
| 1.3 | Polyhydroxy Esteramide | 15 | 3 | 2.8–3.2 |  |  | 2.2–2.3 |  |  |
| 1.1 | Copolymer Acrylamide-Acrylonitrile | 15 | 1 | 3.2–3.3 |  |  | 2.4–2.5 |  |  |
| 1.3 | { Diglyceryl Phthalate<br>Tripolymer: Styrene, Butyl Acrylate, Hydroxy Ethyl Methacrylate } | { 25<br>10 } | 1 |  |  | 1.7–2.3 |  |  | 0.9–1.2 |

All compositions in approximately same range of molding plasticity; aging shrinkage measured on 4″ x ⅛″ disc by exposure for 48 hours at 220° F.

[1] Molding cycle: First valve—seconds mold closed without pressure; second valve—seconds mold closed on high pressure (2500 p. s. i.); third valve—seconds mold breathed; breathe interval followed by closing of mold under high pressure for optimum cure time.

Dimensional instability of molded products under service conditions where some degree of exposure to high temperatures is involved acts as a deterrent to wide scale use. Automotive, tractor and aircraft distributors and magneto parts are examples of molded insulators which impose severe conditions upon the plastic. Frequently these parts have large molded-in inserts which in themselves impose stresses that add to those induced by shrinkage of the part. Improvement in dimensional stability brought about by the process and the composition of the present invention combined with suitable plasticizers make it possible to significantly improve stability of molded parts having embedded inserts. This is illustrated in Table 3 in which compositions were prepared according to Example 5.

Table 3.—Cracking around molded-in metal inserts

| F/M | Plasticizer | Percent | Minutes Cure At 163° | Cracking Test | | | | | |
|-----|-------------|---------|----------------------|---------------|---|---|---|---|---|
| | | | | Part 1 (3 cycles— each cycle 15 hours 150° 9 hours Room Temp.) | | Part 2 (6 days 150°) | | Part 3 (Cooled to 25°) | |
| | | | | Number Failed | Cycle | Number Failed | Days | Failed | No. Failure |
| 1.3 | Diglyceryl Phthalate | 25 | 2 | | | | | 2 | |
| | | | 3 | | | | | 1 | |
| 1.1 | ...do... | 25 | 3 | | | | | | 2 |
| | | | 5 | | | | | | 2 |
| 1.3 | Copolymer Acrylamide-Acrylonitrile | 25 | 5 | | | 2 | 1 | | 2 |
| | | | 7½ | | | | | | 2 |
| 1.3 | {Diglyceryl Phthalate | 15 | 3 | | | | | | 2 |
| | Copolymer Acrylamide-Acrylonitrile} | 10 | 5 | | | | | | 2 |
| 1.3 | {Diglyceryl Phthalate | 25 | 5 | | | | | | 2 |
| | Tripolymer: Styrene, Butylacrylate, Hydroxyethyl Methacrylate} | 10 | 7½ | | | | | | 2 |
| 1.3 | | | 3 | Failed after molding (2) | | | | | |
| | | | 5 | Failed after molding (2) | | | | | |

Molded test piece—2" x 7/16" cylinder with 1¾" x 7/16" steel insert molded by transfer molding technique.

EXAMPLE 6

A three-stage reaction similar to that of Example 2 was used to prepare a resin having a formaldehyde-melamine ratio of 0.9. For this purpose 315 parts of melamine were charged into a suitable flask followed by 1387 parts of water and 81 parts of 37% neutral aqueous formaldehyde solution. The formaldehyde-melamine ratio at this point was 0.4. After the addition of sodium hydroxide to adjust the pH value to 9.1, the slurry was heated to reflux. 61 parts of formalin were added at reflux, raising the formaldehyde-melamine ratio to 0.7. 22 minutes later, after regaining reflux temperature, the final increment, 40.5 parts of formalin were added. Heating was then continued for 12 minutes at reflux temperature, 101° C. to 103° C. The final product was a turbid solution having approximately 20% dissolved solids. A filtered test sample proved miscible with water. A small amount of solids detained in this test, if assumed to be melamine, indicated a formaldehyde-melamine ratio for soluble material of 0.94.

The main product was tray dried at 70° C. over a period of 16 hours to a 1 millimeter resin layer and the subdivided material at 85° C. over a period of 5 hours.

By preheating the granular product in the mold at 200° C. for 3 to 4 minutes followed by cure intervals of 1 to 3 minutes at 2000 p. s. i. and cooling the mold under pressure before release of the piece, molded 2" x ⅛" discs of glossy, translucent appearance were obtained. These pieces withstood 30 minute boiling water test with weight increases of 2.1% and 3.6% for 1 and 3 minute cures, respectively.

EXAMPLE 7

A resin solution was prepared in the same manner as in Example 2, with a formaldehyde-melamine ratio of 1.1. The clarified solution was concentrated under reduced pressure at 60° C. to 65° C. to a solids concentration of 51%. The clear, warm syrup was then used to saturate various types of heat-resistant fabrics preparatory to laminating. These included nylon, polyacrylonitrile desized woven glass cloth and desized glass mat. The saturated sheets were dried at 70° C. to 85° C. until the resin was polymerized to a degree coincident with normal laminating plasticity. The resin content of the dried sheets was in the order of from 35% to 50% by weight, based on the total weight. Assemblies of sheets were then pressed at temperatures of 175° C., 200° C. and 225° C. between polished stainless steel plates at 1000 pounds per square inch pressure for intervals of 3 to 5 minutes. A 50% resin solids solution of a resin having a formaldehyde-melamine ratio of 2.0 was converted to laminates. At a 225° C. molding temperature, the nylon and polyacrylonitrile fabric fillers discolored so that any slight discoloration due to the resin was masked. With nylon filler and a formaldehyde-melamine ratio of 2.0 resin at a 225° C. molding temperature, discoloration was much more severe than with a formaldehyde-melamine ratio of 1.1 resin. With glass cloth and mat fillers, a formaldehyde-melamine ratio of 2.0 resin also discolored the laminate at 225° C. whereas with a formaldehyde-melamine ratio of 1.1 resin this was very slight. At 200° C. a laminate from the latter resin was colorless. Laminates otherwise were marked by normal gloss and translucence.

As will be seen from an examination of the preceding examples wherein the process for the preparation of the molded compositions was set forth, it is preferred that the compositions be prepared in a multi-stage reaction. Initially all of the melamine is charged into a suitable reactor. The amount of formaldehyde introduced into the reaction during the various stages will depend upon the number of stages involved. Thus, when a two-stage reaction is carried out, approximately one-half of the total mols of formaldehyde will be initially reacted with the melamine present. When a three-stage reaction is carried out, approximately one-third of the total mols of formaldehyde will be introduced into the reaction at each stage in the production of the resin. In the event four or more stages are employed in the preparation of the resinous composition, approximately $1/n$th of the total mols of formaldehyde will be introduced into the reaction at each stage in the production thereof wherein $n$ represents the total number of stages employed in the preparation of the resin. After the melamine has been charged into the reaction vessel, $1/n$th of the total mols of formaldehyde are then charged and the reaction mixture is heated within a period of about 30 minutes to reflux temperature. When the reaction mixture reaches reflux temperature, an additional increment of approximately $1/n$th of the total mols of formaldehyde to be reacted is introduced into the reaction mixture. Obviously, the introduction of the additional increment of formaldehyde into the reaction mixture will cause a reduction in temperature of the mixture. Therefore, it is necessary to re-heat the reaction mixture to reflux temperature after each introduction of formaldehyde thereto. The additional introduction of formaldehyde into the reaction and the subsequent re-heating of the mixture to reflux temperature is continued until after the introduction of the final increment of the formaldehyde into the mixture. The number of stages chosen is for reaction and the time allotted for each may be so controlled that the final solution is either hydrophilic or characterized by some degree of hydrophobicity. During the condensation reaction, the pH value is maintained at about 8.0 to about 9.5. Suitable alkaline or acidic materials, as are well known in the art, may be employed to obtain the desired pH value. The multi-stage process described may also be adapted to continuous operation. In such an operation the reaction mixture may pass successively from one kettle to another of a series in which the successive stages are carried out. The final resin solution is cooled to 50–65° C. for storage or it may be stored at a lower temperature and reheated to clarify it before use. The final pH is adjusted to within the order of about 9.5 to 10.5.

The resin syrup prepared in accordance with this invention may be vacuum concentrated and dried to form a molding composition as described in Examples 1 and 7 above. It will be apparent to those skilled in the art that a molding composition may also be prepared by spray drying and the like. When it is desired to prepare a resinous molding composition containing a filler, the filler may be conveniently impregnated with the resin syrup, dried and comminuted as is well known in the art. Alternatively, the dried resinous composition may be admixed with a filler, as for example in a ball mill or other suitable processing equipment, to form the molding composition.

In the production of molding compositions containing fillers, the amount of filler employed will depend upon the ultimate use of the molding composition and properties sought such as electrical properties and the like. The amount of the filler employed may therefore vary over very wide ranges up to as high as 80% by weight, based on the total weight of the final molding composition. Illustrative examples of fillers that may be incorporated into the molding composition are such as alpha-cellulose, wood flour, walnut shell flour, asbestos in the form of a powder or short or long fibers, finely divided silicon carbide, carbon black, diatomaceous earth, slate dust, powdered or flaked mica, cloth cuttings (e. g., silk, rayon, wool, linen, cotton, nylon or cloth made from glass fibers or from polymeric or copolymeric acylonitrile fibers, etc.), ground cork, silica, etc.

In the event a plasticizer or modifying resin is combined with the composition of this invention, the plasticizer or modifying resin may be introduced at one of a number of points in the process. The plasticizers may be employed alone or in combination with other plasticizers. Examples of the modifying resins or plasticizers that may be employed are such as the carbamates, e. g., N-hydroxyethyl-beta-hydroxyethyl carbamate, N,N-bis-hydroxyethyl-beta-hydroxyethyl carbamate; copolymers such as acrylamide-acylonitrile of monomer weight ratios of from 20:80 to 60:40, respectively, acrylamide-butylacrylate of monomer weight ratios of from 50:50 to 30:70, respectively, acrylamide-ethylacrylate of monomer weight ratio of 50:50; polyesters, e. g., diglyceryl phthalate, glyceryl phthalate, dipentaerythritol sebacate; polyhydroxy esteramides, e. g., polytris(hydroxymethyl)aminomethane adipic acid, pentaerythritol-adipic acid-ethylene diamine; tripolymers, e. g., styrene-butylacrylate-hydroxyethyl methacrylate, acrylonitrile-ethylacrylate-hydroxyethyl methacrylate, acrylonitrile-butylacrylate-hydroxyethyl methacrylate; formals, e. g., pentaerythritol diformal and glycerine monoformal; polyamides, e. g., nylon; epoxides; and the like. When the plasticizer of modifying resin is used alone, it is preferred that the amount employed be within the order of from about 15% to about 25% by weight based on the total weight of the resin. The amount of plasticizer that may be used, when employed in combination with other plasticizers, may be within the order of from about 20% to about 35% by weight based on the total weight of the resin. The amount of the plasticizer employed may of course vary for different applications, as for example from as little as 10% to as much as 45% by weight, but it is preferred that the amount employed be within the order set forth hereinabove.

During the preparation of the molding composition of the present invention, dyes, pigments and other colorants may be added for the preparation of colored molding compositions. If desired, mold lubricants, curing catalysts and the like may also be combined with the resin during the formation of the molding composition. Other modification apparent to those skilled in the art may be made to the molding composition and the process of its preparation as herein disclosed and described.

In addition to their use in molding and laminating compositions, the resins of the present description or their solutions may be adapted for use as an adhesive, for example in wood gluing operations; as a textile finishing agent, for example in crease-proofing cotton or rayon; as a binder, for example in binding antistatic agents or fire retardants to various fabrics including those of nylon, polyacrylonitrile, polyester fibers; for treating paper to improve its strength properties; also as a binder in the fabrication of asbestos products, abrasive products, brake linings and the like. Resins of the present description may also be used in conjunction with other resins such as urea-formaldehyde, thiourea-formaldehyde, biuret-formaldehyde and phenol-formaldehyde.

While the above description of the present invention has been limited to the preparation of the resinous molding composition by the condensation of melamine with formaldehyde, it will be understood that other amino triazines and aldehydes may also be employed for the preparation of compositions having improved dimensional stability and which may be cured to an infusible and insoluble state at temperatures greater than 170° C. Illustrative examples of other amio triazines that may be used are triazines containing at least one amino group, for instance, ammeline, ammelide, formoguanamine, 2-amino-1,3,5-triazine and their substituted products; 2,4,6-trihydrazino-1,3,5-triazine; 2,4,6 - tris(monoalkylamine)-1,3,5-triazines (e. g., 2,4,6-tris(ethylamino)-1,3,5-triazine); 2,4,6-tris (arylamino)-1,3,5-triazines (e. g., 2,4,6-tris(phenylamino)-1,3,5-triazine); melam; melem; melon; 2-chloro-4,6-diamino - 1,3,5-triazine; 2-amino-4-hydroxyl-6-phenyl-1,3,5-triazine; 2,4-diamino-6-methyl - 1,3,5 - triazine; and the like can be condensed with lower or higher aliphatic aromatic or heterocyclic aldehyde to produce the resinous compositions included in the present invention in its broader aspects. However, it is preferred to use melamine.

Formaldehyde or compounds engendering formaldehyde, e. g., paraformaldehyde, hexamethylene tetramine, etc., comprise the preferred aldehydic component in the preparation of the resinous composition of my invention. However, for some applications other aldehydes may be used as, for example, acetaldehyde, propionaldehyde, butyraldehyde, acrolein, methacrolein, crotonaldehyde, benzaldehyde, furfural, etc., mixtures thereof or mixtures of formaldehyde with one or more thereof.

I claim:

1. A process for preparing a thermosetting melamine-formaldehyde resinous composition which comprises reacting at reflux temperature in a series of $n$ stages melamine and aqueous formaldehyde until the melamine has dissolved and the condensation reaction has advanced to a point within the hydrophilic to partly hydrophobic state wherein the formaldehyde is introduced into the sphere of reaction in amounts approximating $1/n$th of the total quantity of formaldehyde to be introduced, $n$ times, the pH value is maintained at about 8.0 to about 9.5 during the reaction, the mol ratio of total formaldehyde to melamine is within the order of about 0.9:1 to about 1.5:1, respectively, and $n$ is an integer of at least 2.

2. A process for preparing a thermosetting melamine-formaldehyde resinous composition which comprises reacting at reflux temperature in a series of $n$ stages melamine and aqueous formaldehyde until the melamine has dissolved and the condensation reaction has advanced to a point within the hydrophilic to partly hydrophobic state wherein the formaldehyde is introduced into the sphere of reaction in amounts approximating $1/n$th of the total quantity of formaldehyde to be introduced, $n$ times, the pH value is maintained at about 8.0 to about 9.5 during the reaction, the mol ratio of total formaldehyde to melamine is within the order of about 1.1:1 to about 1.3:1, respectively, and $n$ is an integer of from 2 to 3.

3. A process for preparing a thermosetting melamine-formaldehyde resinous composition which comprises reacting at reflux temperature in a series of 2 stages melamine and aqueous formaldehyde until the melamine has dissolved and the condensation reaction has advanced to a point within the hydrophilic to partly hydrophobic state wherein the formaldehyde is introduced into the sphere of reaction twice in amounts approximating one-half of the total quantity of formaldehyde to be introduced, the pH value is maintained at about 8.0 to about 9.5 during the reaction and the mol ratio of total formaldehyde to melamine is within the order of about 1.1:1 to about 1.3:1, respectively.

4. A process for preparing a thermosetting melamine-formaldehyde resinous composition which comprises reacting at reflux temperature in a series of 3 stages melamine and aqueous formaldehyde until the melamine has dissolved and the condensation reaction has advanced to a point within the hydrophilic to partly hydrophobic state wherein the formaldehyde is introduced into the sphere of reaction three times in amounts approximating one-third of the total quantity of formaldehyde to be introduced, the pH value is maintained at about 8.0 to about 9.5 during the reaction and the mol ratio of total formaldehyde to melamine is within the order of about 1.1:1 to about 1.3:1, respectively.

5. A thermosetting melamine-formaldehyde resinous composition curable to an infusible and insoluble state at temperatures above 170° C. obtained by reacting at reflux temperature in a series of $n$ stages melamine and aqueous formaldehyde until the melamine has dissolved and the condensation reaction has advanced to a point within the hydrophilic to partly hydrophobic state wherein the formaldehyde is introduced into the sphere of reaction in amounts approximating $1/n$th of the total quantity of formaldehyde to be introduced, $n$ times, the pH value is maintained at about 8.0 to about 9.5 during the reaction, the mol ratio of total formaldehyde to melamine is within the order of about 0.9:1 to about 1.5:1, respectively, and $n$ is an integer of at least 2, cooling said resinous composition, adjusting the final pH thereof within the order of about 9.5 to about 10.5, and drying and combining said composition with a filler.

6. The thermosetting melamine-formaldehyde resinous composition of claim 5 cured to an infusible and insoluble state at temperatures between about 170° C. to about 225° C.

7. A thermosetting melamine-formaldehyde resinous composition curable to an infusible and insoluble state at temperatures above 170° C. obtained by reacting at reflux temperature in a series of $n$ stages melamine and aqueous formaldehyde until the melamine has dissolved and the condensation reaction has advanced to a point within the hydrophilic to partly hydrophobic state wherein the formaldehyde is introduced into the sphere of reaction in amounts approximating $1/n$th of the total quantity of formaldehyde to be introduced, $n$ times, the pH value is maintained at about 8.0 to about 9.5 during the reaction, the mol ratio of total formaldehyde to melamine is within the order of about 1.1:1 to about 1.3:1, respectively, and $n$ is an integer of from 2 to 3, cooling said resinous composition, adjusting the final pH thereof within the order of about 9.5 to about 10.5, and drying and combining said composition with a filler.

8. The thermosetting melamine-formaldehyde resinous composition of claim 7 cured to an infusible and insoluble state at temperatures between about 170° C. to about 225° C.

9. A thermosetting melamine-formaldehyde resinous composition curable to an infusible and insoluble state at temperatures above 170° C. obtained by reacting at reflux temperature in a series of 2 stages melamine and aqueous formaldehyde until the melamine has dissolved and the condensation reaction has advanced to a point within the hydrophilic to partly hydrophobic state wherein the formaldehyde is introduced into the sphere of reaction twice in amounts approximating one-half of the total quantity of formaldehyde to be introduced, the pH value is maintained at about 8.0 to about 9.5 during the reaction and the mol ratio of total formaldehyde to melamine is within the order of about 1.1:1 to about 1.3:1, respectively, cooling said resinous composition, adjusting the final pH thereof within the order of about 9.5 to about 10.5, and drying and combining said composition with a filler.

10. The thermosetting melamine-formaldehyde resinous composition of claim 9 cured to an infusible and insoluble state at temperatures between about 170° C. to about 225° C.

11. A thermosetting melamine-formaldehyde resinous composition curable to an infusible and insoluble state at temperatures above 170° C. obtained by reacting at reflux temperature in a series of 3 stages melamine and aqueous formaldehyde until the melamine has dissolved and the condensation reaction has advanced to a point within the hydrophilic to partly hydrophobic state wherein the formaldehyde is introduced into the sphere of reaction three times in amounts approximating one-third of the total quantity of formaldehyde to be introduced, the pH value is maintained at about 8.0 to about 9.5 during the reaction and the mol ratio of total formaldehyde to melamine is within the order of about 1.1:1 to about 1.3:1, respectively, cooling said resinous composition, adjusting the final pH thereof within the order of about 9.5 to about 10.5, and drying and combining said composition with a filler.

12. The thermosetting melamine-formaldehyde resinous composition of claim 11 cured to an infusible and insoluble state at temperatures between about 170° C. to about 225° C.

References Cited in the file of this patent

UNITED STATES PATENTS

| 2,485,059 | Mohrman et al. | Oct. 18, 1949 |
| 2,563,630 | Wohnsiedler et al. | Aug. 7, 1951 |
| 2,658,054 | Coleman et al. | Nov. 3, 1953 |
| 2,663,699 | Bloem et al. | Dec. 22, 1953 |

FOREIGN PATENTS

| 138,808 | Australia | Sept. 25, 1950 |
| 673,742 | Great Britain | June 11, 1952 |